(12) United States Patent
Zitnick et al.

(10) Patent No.: US 8,625,907 B2
(45) Date of Patent: Jan. 7, 2014

(54) IMAGE CLUSTERING

(75) Inventors: Charles Zitnick, Seattle, WA (US); Rafael Sagula, Kirkland, WA (US); Ashok Chandrashekar, Hanover, NH (US)

(73) Assignee: Microsoft Corporation, Redmond, WA (US)

( * ) Notice: Subject to any disclaimer, the term of this patent is extended or adjusted under 35 U.S.C. 154(b) by 439 days.

(21) Appl. No.: 12/797,778

(22) Filed: Jun. 10, 2010

(65) Prior Publication Data

US 2011/0305399 A1 Dec. 15, 2011

(51) Int. Cl.
G06K 9/62 (2006.01)
G06K 9/68 (2006.01)
G06K 9/70 (2006.01)
G06K 9/36 (2006.01)

(52) U.S. Cl.
USPC .............................. 382/225; 382/226; 382/235

(58) Field of Classification Search
None
See application file for complete search history.

(56) References Cited

U.S. PATENT DOCUMENTS

| | | | |
|---|---|---|---|
| 5,983,218 A | 11/1999 | Syeda-Mahmood | |
| 8,229,219 B1 * | 7/2012 | Ioffe | 382/168 |
| 2007/0005556 A1 | 1/2007 | Ganti | |
| 2007/0174269 A1 | 7/2007 | Jing | |
| 2008/0292196 A1 | 11/2008 | Jain | |
| 2009/0034791 A1 * | 2/2009 | Doretto et al. | 382/103 |
| 2009/0161962 A1 * | 6/2009 | Gallagher et al. | 382/203 |
| 2010/0268714 A1 * | 10/2010 | Moon et al. | 707/737 |

FOREIGN PATENT DOCUMENTS

WO WO2010021625 A1 2/2010

OTHER PUBLICATIONS

Chum et al, "Large-Scale Discovery of Spatially Related Images", 2009, IEEE Transactions on Pattern Analysis and Machine Intelligence, vol. 32, No. 2, pp. 371-377.*
Sivic et al, "Video Google: A Text Retrieval Approach to Object Matching in Videos," 2003, Proceedings of the Ninth IEEE International Conference on Computer Vision, pp. 1-8.*
Mukherjee et al, "Systematic Temperature Sensor Allocation and Placement for Microprocessors," 2006, DAC 2006, pp. 1-6.*
Ondfej Chum et al, "Near Duplicate Image Detection: min-Hash and tf-idf Weighting," 2008, BMVC, pp. 1-10.*
O. Chum, J. Philbin, J. Sivic, M. Isard, and A. Zisserman, "Total Recall: Automatic Query Expansion with a Generative Feature Model for Object Retrieval," Proc. IEEE Int'l Conf. Computer Vision, 2007, pp. 1-8.*
Kennedy et al.; Generating Diverse and Representative Image Search Results for Landmarks; Published Date: 2008; In WWW '08: Proceeding of the 17th international conference on World Wide Web (2008), pp. 297-306.

(Continued)

Primary Examiner — Brian P Werner
Assistant Examiner — David F Dunphy

(57) ABSTRACT

A database of images may be accessed. A feature set may be computed for each image, respectively. Each feature set includes feature integers quantized from interest points of a corresponding image. An initial set of clusters of the feature sets is found based on min hashes of the feature sets. Given the clusters of feature sets, descriptors for each of the clusters are computed, respectively, by selecting feature integers from among the feature sets in a cluster. The clusters are then refined by comparing at least some of the feature sets with at least some of the cluster descriptors, and based on such comparing adding some of the feature sets to clusters whose feature descriptors have similarity to the feature sets.

20 Claims, 6 Drawing Sheets

(56) References Cited

OTHER PUBLICATIONS

Chum et al.; Web Scale Image Clustering; Published Date: May 23, 2008.
Moosmann et al.; Randomized Clustering Forests for Image Classification; Published Date: Sep. 2008; Pattern Analysis and Machine Intelligence, IEEE Transactions on Issue Date: Sep. 2008.
Barnard et al.; Clustering Art; Retrieved Date: Mar. 29, 2010.
Blei et al.; Latent dirichlet allocation; J. Mach. Learn. Res., 3:993-1022,2003.
Chum et al.; Scalable near identical image and shot detection; In CIVR '07: Proceedings of the 6th ACM international conference on Image and video retrieval, pp. 549-556, New; York, NY, USA, 2007. ACM.
Das et al.; Google news personalization: scalable online collaborative filtering; In WWW '07: Proceedings of the 16th international conference on World Wide Web, pp. 271-280, New York, NY; USA, 2007. ACM.
Dean et al.; Mapreduce: Simplified data processing on large clusters; pp. 137-150, 2004.
M. I. et al.; Dryad: Distributed data-parallel programs from sequential building blocks. 2007.
T. Hofmann; Probabilistic latent semantic indexing; In SIGIR'99: Proceedings of the 22nd annual international ACM SIGIR conference on Research and development in; information retrieval, pp. 50-57, New York, NY, USA, 1999. ACM.
Joly et al.; Robust content-based video copy identification in a large reference database; Image and Video Retrieval, 9(2):511-516, Feb. 2003.
Joly et al.; Content-based copy retrieval using distortion-based probabilistic similarity search; Multimedia, IEEE Transactions on, 9(2):293-306, Feb. 2007.
Nister et al.; Scalable recognition with a vocabulary tree. In CVPR '06: Proceedings of the 2006 IEEE; Computer Society Conference on Computer Vision and Pattern; Recognition, pp. 2161-2168, Washington, DC,; USA, 2006. IEEE Computer Society.
Quack et al.: a system for large-scale, content-based web image retrieval; In Multimedia '04: Proceedings of the 12th annual ACM international conference on Multimedia, pp. 508-511, New York, NY, USA, 2004. ACM.
I. S. S. M. S. Agarwal et al.; Building rome in a day; ICCV 2009.
Sivic et al.; Video google: A text retrieval approach to object matching in videos; In ICCVV '03:;Proceedings of the Ninth IEEE International Conference on Computer Vision; IEEE Computer Society, 2003.
Torralba et al.; Small codes and large image databases for recognition; In Computer Vision and Pattern Recognition, 2008. CVPR 2008. IEEE Conference on, pp. 1-8, Jun. 2008.
Zhong et al.;Bundling features for large scale partial-duplicate web image search; In CVPR '09: Proceedings of the 2009 IEEE Computer Society Conference on Computer Vision and Pattern; Recognition, 2009.

\* cited by examiner

IMAGE CLUSTERING

BACKGROUND

Large image collections may be used for many tasks such as computer vision, geometry reconstruction, data mining, and so on. Despite the effectiveness of some algorithms that may perform such tasks, improved results can be obtained by relying on the density of image data in such collections. The web on the whole has billions of images and is an ideal resource for such endeavors. Recent algorithms have performed similarity based retrieval on large image collections. While this is useful, further benefits can be derived by discovering the underlying structure of an image collection through computationally demanding tasks such as unsupervised appearance-based image clustering. Applications of clustering include improved image search relevance, facilitation of content filtering, and generating useful web image statistics. Also, by caching image clusters, significant runtime savings can be obtained for various applications. However, large scale clustering is challenging both in terms of accuracy and computational cost.

Traditional algorithms for data clustering do not scale well for large image collections. In particular, iterative algorithms (e.g., k-means, hierarchical clustering) and probabilistic models exhibit poor scaling. Further, some traditional algorithms may need to determine the number of clusters, which is difficult in large collections. The scale of an image dataset may also lead to a preference for certain platforms. In particular, datacenter platforms and programming frameworks like Map-Reduce and Dryad Linq may be desirable, yet iterative algorithms may not adapt well to such platforms.

Scalable techniques for image clustering are discussed below.

SUMMARY

The following summary is included only to introduce some concepts discussed in the Detailed Description below. This summary is not comprehensive and is not intended to delineate the scope of the claimed subject matter, which is set forth by the claims presented at the end.

A database of images may be accessed, and a feature set may be computed for each image, respectively. Each feature set includes feature integers quantized from interest points of a corresponding image. An initial set of clusters of the feature sets is found based on min hashes of the feature sets. Given the clusters of feature sets, descriptors for each of the clusters are computed, respectively, by selecting feature integers from among the feature sets in a cluster. The clusters are then refined by comparing at least some of the feature sets with at least some of the cluster descriptors, and based on such comparing adding some of the feature sets to clusters whose feature descriptors have similarity to the feature sets.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Overview

Embodiments discussed below relate to clustering images. This description will begin with an overview of how a large scale image collection, and features of images therein, may be obtained. A general clustering approach will be described next, followed by detailed description of various clustering stages.

Collection of Images and "Bag of Features" Analysis

Figure 1:
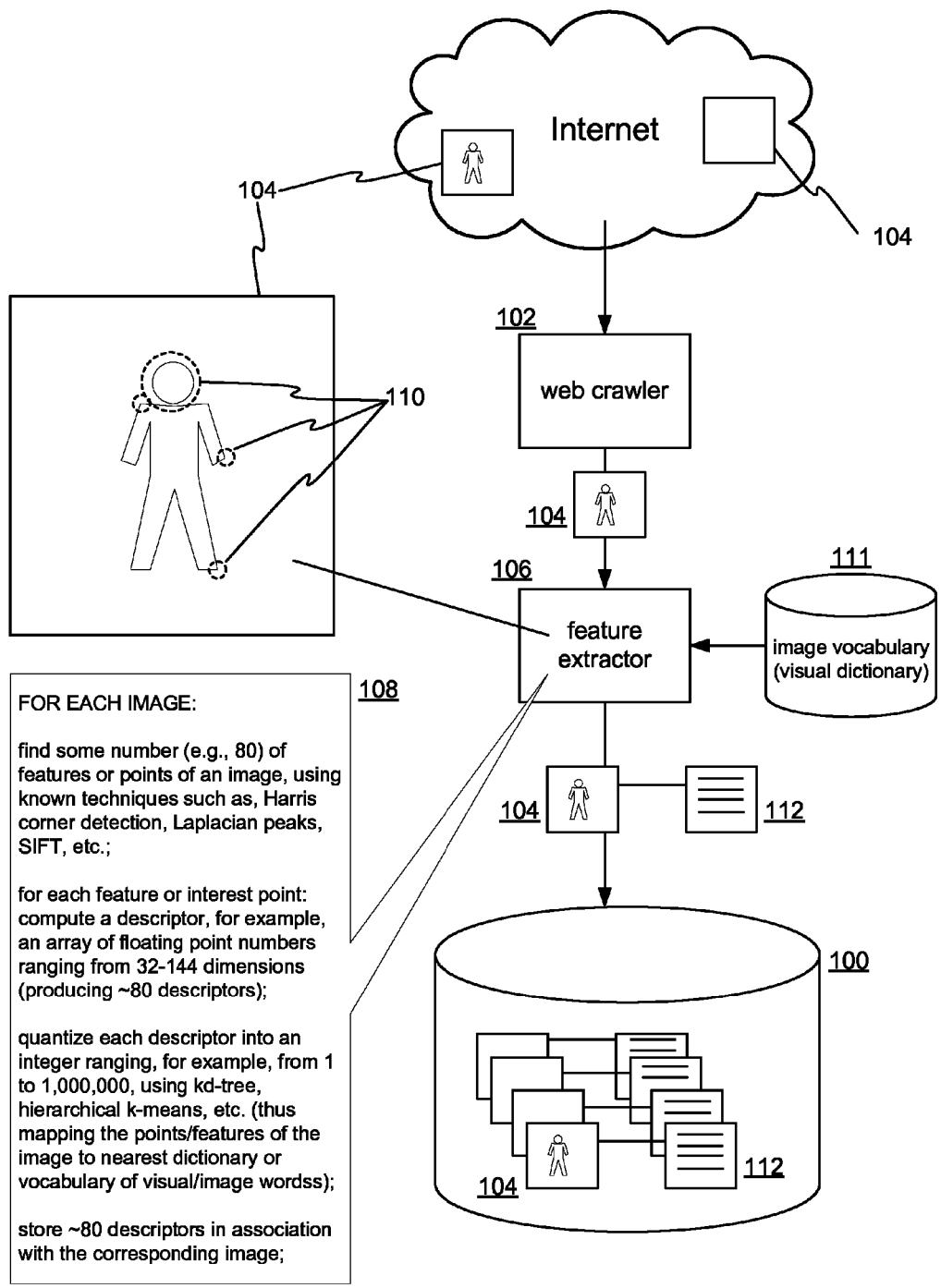
FIG. 1 shows a system for collecting images and computing features of the images.

FIG. 1 shows a system for collecting images and computing features of the images. While a collection (dataset) or database of images 100 may be obtained in any way, large collections may be readily obtained using available crawling technology. A web crawler 102 may crawl the Internet to collect images 104 from web pages, databases, from within documents or content of web pages, from databases, message feeds, and so on. A feature extractor 106 may then use any of a variety or combination of known feature analysis techniques to perform a feature extraction process 108. Specifically, for each crawled image, the feature extractor 106 may find some number (for example, 80) of image features or points of interest 110 of an image 104. For example, Harris corner detection, Laplacian peaks, SIFT (gradient orientation histogram), SPIN (rotation invariant histogram of intensities), RIFT (rotation invariant version of SIFT), and so on, may be used alone or in combination to find image features or points of interest 110.

Each such found point of interest 110 may then be represented by a descriptor, for example, an array of floating point numbers (e.g., from 32 to 144 floats) computed from the point of interest 110. Each descriptor of the current image may then be quantized to a word of an image-vocabulary dictionary 111, which may be on the order of 1,000,000 image-data "words" (features). Such dictionaries are often referred to as a "bag of features" or "bag of words". Techniques for computing such a dictionary are described elsewhere. In any event, these quantized words or features of an image will be referred to, for discussion, as "integer features". In one embodiment, numerous points of interest may be found (e.g., hundreds) for an image, but only the top N (e.g. 80) points may be used. The top N might be those that are closest to a word in the dictionary 111 or those with strongest interest point responses, etc.

An image descriptor mentioned in the paragraph above may be quantized to an integer feature (a word in the dictionary) using a kd-tree, hierarchal k-means techniques, or other known techniques. That is, a data structure may be used to map the image descriptor to a word in the dictionary that is closest or most similar to the image descriptor.

The collection of thus-derived integer features for an image form a final feature set 112 for the image (e.g., ~80 integers each ranging from 1 to 1,000,000). Each such image 104 and its corresponding feature set 112 are stored in association with each other in the image database 100. As will be explained, the feature sets 112 will be used for clustering the images 104.

General Clustering Approach

Figure 2:
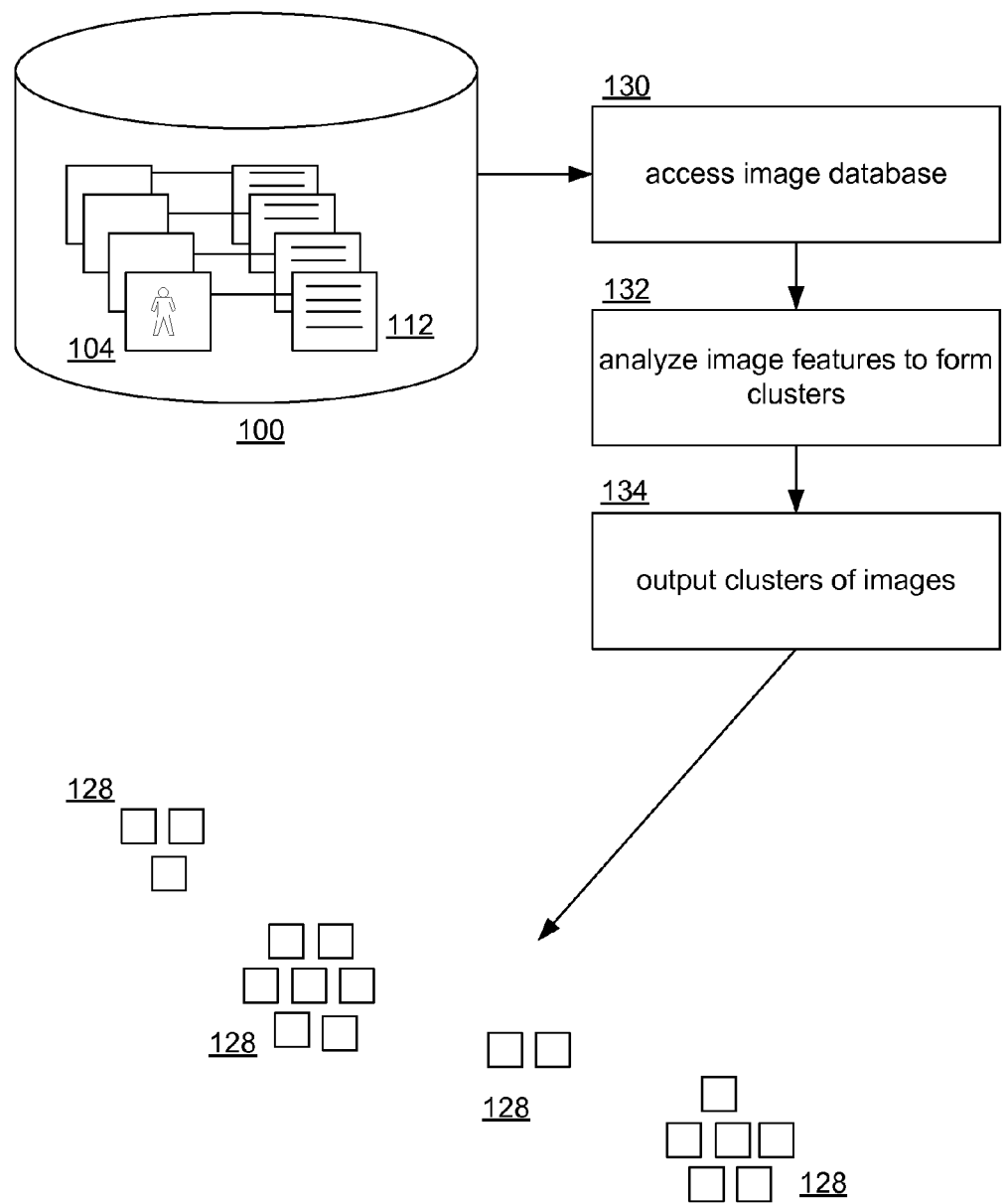
FIG. 2 shows a process for forming image clusters.

FIG. 2 shows a process for forming image clusters 128. Each cluster 128 will include images that are computationally similar and which, with varying results, will have similar appearance. One or more computers (described below with reference to FIG. 6) will access 130 the images in the image database 100. More particularly, the feature sets of the images will be accessed and used as proxies for the images themselves. The image feature sets 112 will be analyzed 132 to form image clusters 128, and the image clusters 128 are stored or outputted 134 for practical use by search engines, imaging applications, geometry reconstruction, statistical analysis, and so on.

Figure 3:
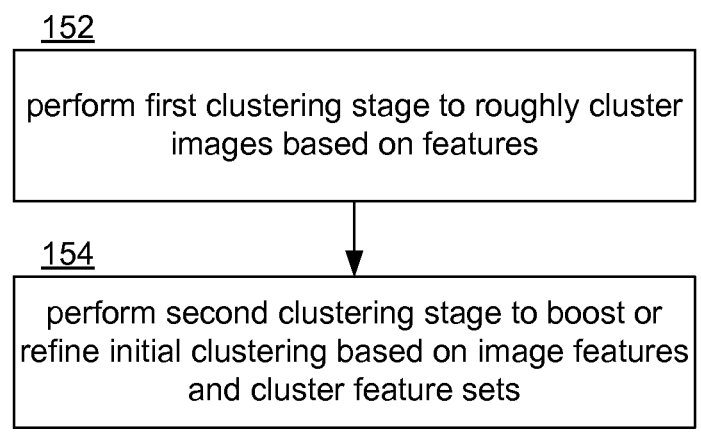
FIG. 3 shows a process by which image features sets may be analyzed to form clusters.

FIG. 3 shows a process by which image features sets may be analyzed 132 to form clusters 128. A first clustering stage 152 may form rough or imprecise image clusters (a first set of clusters) using any techniques that are sufficiently fast for the number of images in the image database 100. Embodiments using Min Hash techniques will be described with reference to FIG. 4. A second clustering stage 154 may then be performed on the first set of clusters. This may involve boosting or improving recall of clusters in the first set of clusters by moving images into better matching clusters. As will be described in reference to FIG. 5, this second clustering stage may involve comparing each image feature set to the features of each cluster. That is, image feature sets may be compared against cluster feature sets (features from various of the image feature sets in a cluster).

First Stage

Figure 4:
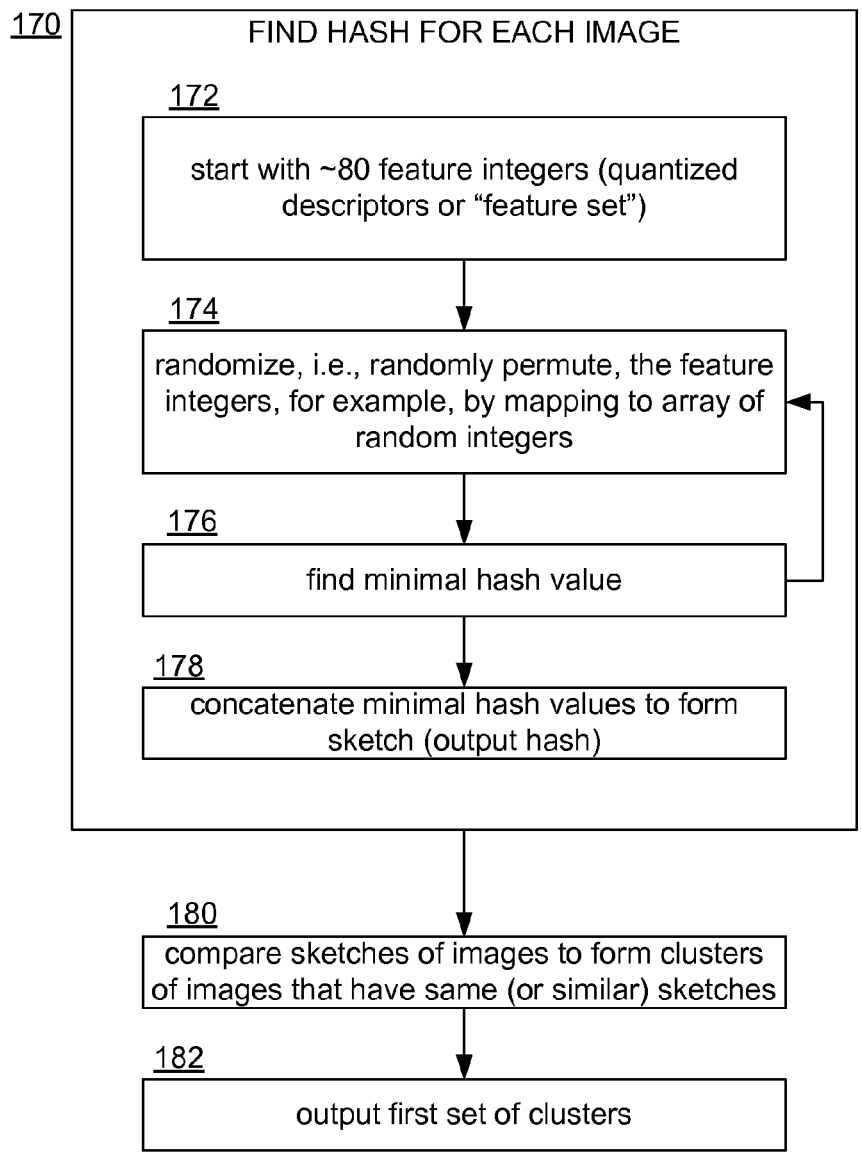
FIG. 4 shows a first clustering stage process.

FIG. 4 shows a first clustering stage process. Note that an image and its corresponding image feature set will be referred to interchangeably; a feature set represents its image. For each image in the image database 100 (or a queried set of images therefrom), a hash computation 170 is performed, using, for example, Min Hash techniques. This involves starting 172 with the feature set for the current image for which hash computation 170 is being performed. The integers in the current feature set are randomized 174, that is, the integer features are mapped to an array of random integers (random words in the visual dictionary). Using small integers as examples (actual values may range to 1,000,000 in one embodiment) If the current feature set is {58, 10, 102, 34, . . . , $F_{80}$}, then the Min Hash takes the 1,000,000 possible integers (the dictionary) and permutes them into a random order (while a 1 to 1 random mapping is desirable, randomized mapping is sufficient). For example, the randomization {110, 52, 64, 31, . . . } might be produced. The min hash value is found 176 by taking the minimum in the randomized set that maps to an integer in the current feature set, in this case, 31. In one embodiment, the forming of a randomized 174 set and finding 176 a minimum hash value thereof may be repeated (e.g., 3 times), and the results concatenated 178 to form an output hash value (often referred to as a sketch).

By way of explanation, the probability of two min hashes being the same is the same as the Jaccard distance between the two sets of number (the two feature sets). In other words, the probability that two hash values are the same is approximately equal to the intersection of the corresponding features over the union of those features, and the probability of the hashes colliding is the probability of the original numbers being the same. However, a single hash may not be sufficiently unique; the probability that the two features sets will have a single feature in common may be too high. To make a hash more unique, a sketch is formed, which is a concatenation of several min hashes. If only one min hash value is used, then too many images may collide. With a sketch, there may be greater confidence that the corresponding images are the same or similar, as there will be a greater number of common features. If the probability of each one of these min hashes colliding is X, then the probability of a match is $x^K$ (where K is the number of hashes concatenated, e.g., 3) so the probability of a collision colliding is less. What may be done, then, is for every image, some predetermined number of sketches (e.g., 25) may be generated, each with a size 3 (3 concatenated min hashes).

Images that share the same sketches can be efficiently found by sorting the images based on each of their computed sketches. Images that share a sketch will neighbor each other in the sorted list. The sketches for each image may be sorted, and the sorted values searched or compared 180 to determine if two hashes (and hence two images) are the same. If two sketches are the same, the corresponding two different images (feature sets) share at least 3 features, which indicates that they may be the same, and the feature sets are added to a potential cluster. When finished comparing 180 sketches, a first set of clusters is outputted 182. These clusters will have been computed in a fast and scalable manner, however, initial clusters may have high precision but poor recall, and additional cluster refinement may be desirable. Additional refinement may be accomplished in the second stage, described in the next section. While a min hash function may be used, any locality sensitive hashing (LSH) technique may be used. For example, other LSH techniques have been designed for approximating L2 or L1 distances between features, as opposed to the hamming distance approximated by min hash.

Second Stage

In practice, the clusters in the first set output by the first stage may tend to be small with highly similar or identical images in clusters. That is, a given cluster may have mostly images that are very close or similar to each other. There may also be images that are nearby that should be part of the given cluster, but the images did not have matching hashes. A second stage may therefore be performed to refine the clusters and move images into clusters that are a closer fit for those images. That is, recall of the initial clusters may be boosted.

Figure 5:
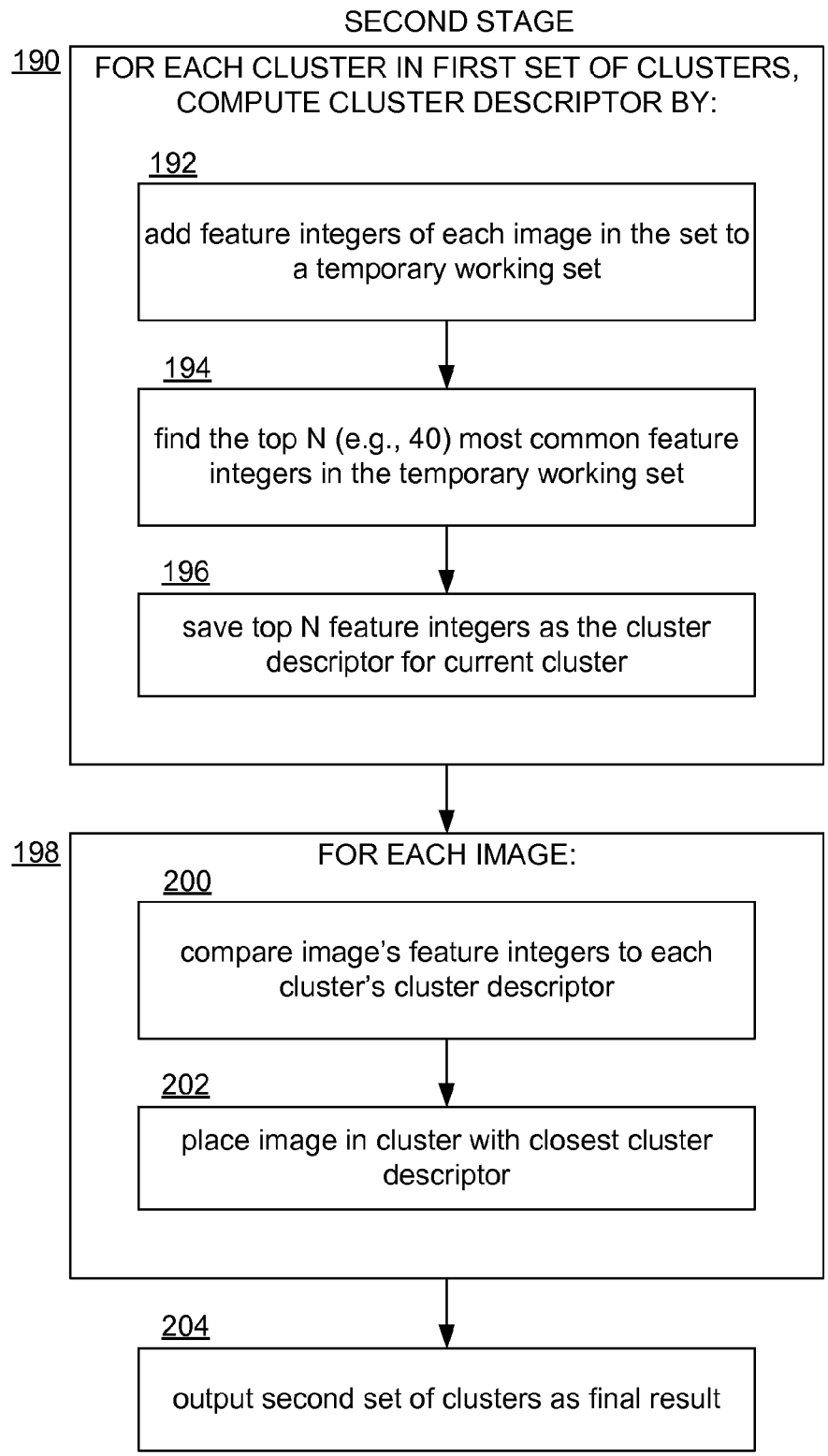
FIG. 5 shows a second stage of image clustering.

FIG. 5 shows a second stage of image clustering. Initially, a descriptor-computing step 190 is performed for each cluster outputted by the first stage. Step 190 computes a cluster descriptor (analogous to a phrase of words/features in the dictionary/vocabulary). Specifically, given a current cluster whose cluster descriptor is to be computed, the feature integers in each feature set that belongs to the current cluster are added to a temporary working set, with duplication counted. That is, for each feature integer in each image in the cluster, the number of times the feature integer occurs in a feature set of the cluster is counted in the temporary working set. The top N (e.g. 40) integer features (the 40 most common integer features in the cluster's feature sets) are found 194. These top N feature integers are then saved 196 as the cluster descriptor for the current cluster. Note that any other technique may be used to form a cluster descriptor, though preferably feature integers will be drawn from among many of the feature sets in the cluster and will thus represent the cluster members as a whole. For example, some feature integers might be weighted based on information in the vocabulary, or they might be weighted based on information such as cluster size, the number of clusters, etc. In one embodiment, a histogram of feature integers may be computed for each cluster, and TF/IDF may be used to select the top N most relevant feature integers.

Having found a cluster descriptor (set of feature integers) for each cluster, a comparing process 198 is then performed for each image; each image's feature set is tested for similarity to each cluster's cluster descriptor. For each image, the feature integers in the image's feature set are compared 200 to the feature integers in the current cluster's cluster descriptor.

Any variety of means of comparison may be used. In one embodiment, an image may be added to or placed 202 in a cluster if it has 7 or more feature integers in common with the feature integers in the current cluster descriptor (in some embodiments, the placed 202 image may be removed from a prior cluster to which it belonged). In other embodiments, various known measures of distance or proximity may be used such as TF/IDF weighting. The resulting refined clusters are then outputted 204.

Matching every cluster descriptor against every feature set may be performed by initially creating an inverse lookup table that maps feature integers to cluster descriptors, thus, given a feature integer of an image, it may quickly be determined which clusters the feature integer is found in. If such a lookup process reveals that there is an image has 7 or more feature integers in a cluster, then the image may be added to that cluster. In some embodiments, an image may be included in only one cluster, for instance, the cluster whose cluster descriptor is closest to the image's feature set.

Various refinements and improvements may be used. Some of the outputted 204 clusters may exhibit incoherency; some member images may have little semantic similarity. This may occur when images have large numbers of globally common features. That is, images that have features with high probability of occurrence across the entire image collection may not place well. However, these types of images may be identified and removed by, for each cluster, for a given cluster, determining a quality score as the sum of the TF/IDF scores of the features in the given cluster's cluster descriptor. Clusters with low quality scores may be eliminated.

The second stage may be repeated in iterative fashion, but improvements may quickly become marginal. One pass provides satisfactory results for some input image databases, which is helpful for large image databases. Also, it should be noted that given clusters of feature sets, it is trivial to compute final clusters of images per se; a feature set of an image acts like an identifier for that image. In one embodiment, computations may be performed using addresses of or pointers to images and feature sets and only the addresses or pointers are manipulated to form clusters.

The Map-Reduce framework for Min Hash has been described elsewhere and is well suited for data center platforms to implement embodiments described above. Algorithmic extensions to Min Hash discussed herein can be expressed in relational algebra, thus, any stage may be readily implemented in the Dryad framework and therefore executed on data center platforms.

CONCLUSION

Figure 6:
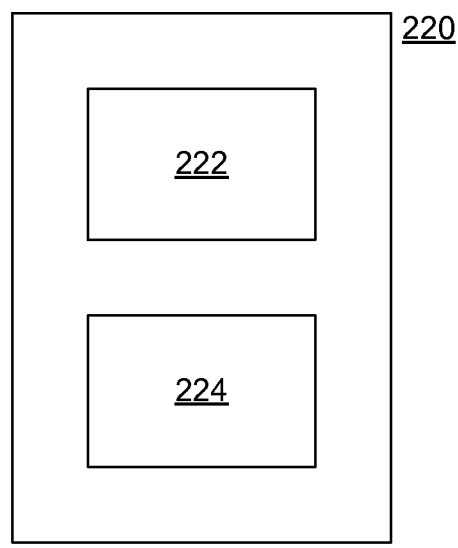
FIG. 6 shows an example computer which may be used to implement embodiments and features discussed herein.

FIG. 6 shows an example computer 220 which may be used to implement embodiments and features discussed above. The computer 220 may include storage 222 (volatile memory, non-volatile memory, and/or disk storage, etc.) and one or more processors 224. One or more computers 220 may operate cooperatively as in the case of the data center mentioned above. One of ordinary skill will be able to write code based on the description above and therefore realize the embodiments in the form of information stored in the storage 222 or in external device readable media (e.g., disks, memory sticks, etc.). This is deemed to include at least media such as optical storage (e.g., CD-ROM), magnetic media, flash ROM, or any current or future means of storing digital information in a form readily and reliably usable by computer 220. The stored information can be in the form of machine executable instructions (e.g., compiled executable binary code), source code, bytecode, or any other information that can be used to enable or configure computing devices to perform the various embodiments discussed above. This is also deemed to include at least volatile memory such as RAM and/or virtual memory storing information such as CPU instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A method implemented by one or more computers to cluster images, the method comprising:
    accessing a set of images, each image having a corresponding feature set, respectively, each feature set comprising feature integers representing features of the corresponding image;
    perform a first clustering step comprising forming initial clusters of the feature sets according to the feature integers of the feature sets;
    computing cluster descriptors for the initial clusters, respectively, where a descriptor for a given initial cluster is computed by selecting and including in the feature set feature integers from among the feature sets in the given initial cluster, each feature set in the given initial cluster corresponding to a different one of the images in the set of images, each cluster descriptor comprising a set of feature integers selected from at least two different feature sets in the corresponding initial cluster such that each cluster descriptor comprises feature integers of multiple of the images, whereby each initial cluster has a feature set comprised of feature integers from two or more of the feature sets in the initial cluster; and
    refining the initial clusters by comparing at least some of the feature sets of the images with at least some of the cluster descriptors, and based on such comparing moving some of the features sets from corresponding initial clusters to other initial clusters.

2. A method according to claim 1, wherein a feature set of an image comprises a set of integers obtained by quantizing descriptors computed from features of the image.

3. A method according to claim 1, wherein the forming of the initial clusters comprises computing min hashes of the feature sets.

4. A method according to claim 3, wherein the forming of the initial clusters further comprises sorting the min hashes of the feature sets and forming clusters of the feature sets that have matching min hashes.

5. A method according to claim 3, wherein the min hash of a feature set comprises a concatenation of multiple different min hashes of the feature set.

6. A method according to claim 1, wherein whether a feature set is moved to another cluster is determined based on the number of feature integers common to both the feature set and the cluster descriptor of the other cluster.

7. A method according to claim 6, wherein the number of feature integers is determined by using a reverse lookup table that maps feature integers to clusters.

8. One or more computer-readable storage storing information to enable one or more computers to perform a process, the process comprising:
    accessing a plurality of feature sets of respective images, each feature set of an image comprising a plurality of features of the image;

for each feature set, given a feature set, computing a plurality of sketches, each sketch of the feature set comprising a concatenation of hashes of the feature set;

placing the feature sets in clusters based on the respective sketches;

adding a set of the feature sets to a set of the clusters, where, for a given one of the features sets in the set of feature sets, and for a given one of the clusters in the set of clusters, a determination is made whether to add the given feature set to the given cluster by comparing the features of the given feature set with top N features selected from among the feature sets in the given cluster, the top N features selected by identifying the N most common features among the features of the feature sets in the given cluster, wherein the top N features includes features from different feature sets, of different respective images, in the given cluster; and based on the added-to clusters of feature sets, storing information indicating which images belong to which clusters.

9. One or more computer-readable storage according to claim 8, wherein the features of a feature set were computed based on image analysis of the corresponding image, the features representing features of subject matter in the image.

10. One or more computer-readable storage according to claim 8, wherein each feature set comprises a bag of features, and the features of each feature set comprise features from a feature dictionary.

11. One or more computer-readable storage according to claim 10, wherein the features of a feature set are computed by mapping features of the images to nearest words in the feature dictionary and using those words as the features of the feature sets.

12. One or more computer-readable storage according to claim 8, wherein the hashes of the sketches comprise min hashes, the min hashes having been computed based on random permutations of the feature sets.

13. One or more computer-readable storage according to claim 8, wherein the hashes are computed from a locality sensitive hashing function.

14. One or more computer-readable storage according to claim 13, wherein the locality sensitive hashing function comprises a Min Hash function.

15. A computing device comprising:

memory storing a plurality of feature sets, each feature set comprising a plurality of features of a corresponding image;

a processor executing instructions that access the feature sets and store in the memory information indicating clusters of the feature sets, the clusters having been computed by the processor computing min hashes of the feature sets and determining which feature sets belong to which clusters based on which feature sets have min hashes with common values;

the processor computing and storing in the memory cluster descriptors for the clusters, respectively, a cluster descriptor comprising a plurality of features from the feature sets in the corresponding cluster including at least two features from two different feature sets; and the processor altering the clusters stored in the memory by adding some of the feature sets to some of the clusters including moving some feature sets to other clusters, where the processor determines whether to add a given feature set to a given cluster based on the features in the given feature set and based on the features in the cluster descriptor for the given cluster, the features in the cluster descriptor for the given cluster including at least two features from two respective different feature sets in the given cluster.

16. A computing device according to claim 15, wherein the features of a feature set for an image comprise quantizations of interest points in the image.

17. A computing device according to claim 15, wherein a min hash of a feature set comprises a concatenation of individual min hashes from different permutations of the feature set.

18. A computing device according to claim 15, wherein for each cluster the processor removes features from the cluster descriptors, where a feature is removed based on how commonly it occurs among the feature sets.

19. A computing device according to claim 18, wherein how commonly a feature occurs is computed using TF/IDF over the set of features in the feature sets.

20. A computing device according to claim 15, determining scores for respective clusters based on features in respective cluster descriptors, and eliminating clusters based on the scores.

* * * * *